Patented June 13, 1950

2,511,390

UNITED STATES PATENT OFFICE 2,511,390

PENICILLOIC ACID-G AND PREPARATION THEREOF

Donald E. Wolf, Franklin Township, Somerset County, N. J., assignor to Merck & Co., Inc., Rahway, N. J., a corporation of New Jersey No Drawing. Application December 20, 1946, Serial No. 717,630

13 Claims. (Cl. 260—302)

This application is a continuation-in-part of my pending application Serial No. 647,213, filed February 12, 1946, now abandoned.

This invention relates to the preparation of certain new chemical compounds, more particularly to new organic acids. More especially, my invention is concerned with the preparation of the new chemical compound d-α-benzylpenicilloic acid, which is useful in the preparation of penicillin and chemically related compounds having antibiotic activity. My invention is also concerned with a novel process by which d-α-benzypenicilloic acid may be prepared in substantially pure form.

d-α-Benzylpenicilloic acid is one of the eight isomers represented by the following formula:

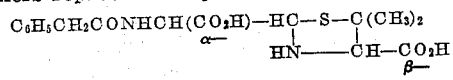

and by the chemical name, 4-carboxy-5,5-dimethyl - α - phenylacetamido - 2 - thiazolidineacetic acid. It can be converted to d-valine and phenylacetyl-amino-acetaldehyde by treatment with mercuric chloride and then with Raney nickel catalyst.

The configuration of d-α-benzylpenicilloic acid is known at the asymmetric carbon atom of the penicillamine portion (i. e., in the 4-position of the thiazolidine ring.) It is, therefore, necessary to designate the isomers by an arbitrary system. In the name d-α-benzylpenicilloic acid the d refers to the configuration of the carbon atom of the penicillamine portion; that is, it signifies the configuration of the penicillamine from which the penicilloate is derived or to which it can be degraded. There are four isomers having the d configuration at this asymmetric center. These are called α, β, γ, and δ isomers. The compounds are distinguished in the nomenclature by inserting the appropriate Greek letter after the sign of rotation of the penicillamine asymmetric atom. The compounds are distinguished by their physical properties or the physical properties of their derivatives. The dimethyl esters of α-, β-, γ-, and δ-benzylpenicilloic acid, which can be readily prepared from these acids as, for example, by treating with an excess of diazomethane in dry ether, have characteristic melting points and specific rotations. The dimethyl ester of d-α-benzylpenicilloic acid (dimethyl d-α-benzylpenicilloate) has a melting point of 87–88° and rotation of $(\alpha)_D+75$–$80°$, (c, 1% in ethanol). Thus the acid is fully defined in terms of the physical properties of the dimethyl ester.

As a starting material in the preparation of d-α-benzylpenicilloic acid, I may use the sodium salt of benzylpenicillin (i. e. sodium penicillin G). Benzylpenicillin is distinguished from other penicillins by the characteristic benzyl group which leads to the formation of phenylacetic acid as one of the products obtained upon hydrolysis of benzylpenicillin with mineral acid. The sodium salt of benzylpenicillin may be secured by growing the organism *Penicillium notatum* #832 NRRL in a suitable culture medium, extracting the acidified culture medium with a solvent such as amylacetate and reacting the benzylpenicillin thus obtained with a weak base such as sodium bicarbonate, thereby forming sodium salt of benzylpenicillin which is readily recovered in crystalline form.

In accordance with the process disclosed in the copending patent application of Nelson R. Trenner, Serial No. 636,520, filed December 21, 1945, now abandoned, when sodium salt of benzylpenicillin is subjected to alkaline hydrolysis, it undergoes ring opening being at the same time converted from a mono- to a dibasic compound. In accordance with the process described in said application, corresponding mono-salts and di- salts result when the hydrolysis is carried out by treatment of sodium salt of benzylpenicillin with a base. As further disclosed in said application, the hydrolysis is preferably effected by adding to an aqueous solution of crystalline sodium salt of benzylpenicillin, a standardized solution of a strong alkali such as sodium hydroxide at a rate which will maintain a pH of 11 to 12. During this addition, it is found that the amount of alkali utilized in excess of that required to raise the pH to 11 to 12 is about 1 molar equivalent based upon the sodium salt of benzylpenicillin in the solution. Back titration with a standardized acid solution such as hydrochloric acid indicates regions of binding at about 5.35 and also at about 2.97.

The initial product obtained when hydrolyzing sodium salt of benzylpenicillin in accordance with the procedure disclosed by Trenner in the above-identified application, utilizing a molar equivalent of an alkali such, for example, as sodium hydroxide, is the di- salt of d-α-benzylpenicilloic acid. The first product obtained upon back titration or reacting with acid, for example, with 1 molar equivalent of hydrochloric acid, is the monosalt of d-α-benzylpenicilloic acid, corresponding with the binding region at a pH of 5.35 previously referred to. The product obtained by the reaction with additional acid, for example when a second molar equivalent of hydrochloric acid is added to the product secured by the alkaline hydrolysis of sodium salt of benzylpenicillin, is an aqueous solution of the dibasic acid, d-α-benzylpenicilloic acid. This corresponds to the region of binding at a pH of 2.97.

I have now been able to recover d-α-benzylpenicilloic acid in the form of an amorphous, substantially pure solid by extracting the aqueous solution of the acid, which is secured by adding, for example 2 molar equivalents of hydrochloric acid to the hydrolysis product. As the extractant for removing the d-α-benzylpenicilloic acid from the solution, I may utilize an organic solvent such as ether. When the ether solution is evaporated to dryness, d-α-benzylpenicilloic acid is secured as an amorphous solid.

As an alternative procedure for securing d-α-benzylpenicilloic acid in substantially pure form, an aqueous solution of a sodium salt of d-α-benzylpenicilloic acid may be acidified, and the acid, which precipitates, recovered by filtration or centrifuge separation. Either the mono- or di- salt of d-α-benzylpenicilloic acid may be employed.

My process for preparing d-α-benzylpenicilloic acid in substantially pure form may be illustrated by the following examples.

*Example 1*

About 500 mg. of sodium salt of benzylpenicillin was titrated with sodium hydroxide keeping pH at 12. When complete ring opening was achieved (as evidenced by the fact that there is no drop in pH when addition of sodium hydroxide is stopped) the sample was back titrated with hydrochloric acid to pH of the mono sodium (about pH 4). The solution was concentrated in vacuo leaving solid mono sodium salt of d-α-benzylpenicilloic acid. This was dissolved in water and acidified with hydrochloric acid; then extracted with ether, and the ether solution was washed with water and evaporated yielding d-α-benzylpenicilloic acid as an amorphous solid.

Analysis calculated for $C_{16}H_{20}O_5N_2S$: C, 54.53; H, 5.59; N, 7.95. Found: C, 54.83; H, 6.23; N, 7.57.

*Example 2*

About 500 mg. of the mono sodium salt of d-α-benzylpenicilloic acid was dissolved in water and acidified with hydrochloric acid. The white precipitate of d-α-benzylpenicilloic acid was filtered from the reaction mixture, washed with water and dried. It was purified by dissolving in acetone then diluting the solution with ether to cause precipitation of the d-α-benzylpenicilloic acid, having the empiric formula $C_{16}H_{20}O_5N_2S$.

Partial analysis gave the following: C, 53.61; H, 5.69.

Modifications may be made in carrying out the present invention without departing from the spirit and scope thereof. It is my intention that such changes and modifications, to the extent that they are within the scope of the appended claims shall be considered as part of my invention.

I claim:

1. d-α-Benzylpenicilloic acid, a compound having the formula:

$$C_6H_5CH_2CONHCH(CO_2H)\underset{\alpha-}{-}HC-S-C(CH_3)_2$$
$$HN-----CH-CO_2H$$
$$\beta-$$

2. The process for preparing d-α-benzylpenicilloic acid which comprising reacting the sodium salt of benzylpenicillin with alkali in aqueous solution, adding 2 molar equivalents of an acid thereto, and extracting d-α-benzylpenicilloic acid from the resulting solution.

3. The process of preparing d-α-benzylpenicilloic acid which comprises reacting the sodium salt of benzylpenicillin with sodium hydroxide in aqueous solution to form the disodium salt of d-α-benzylpenicilloic acid, acidifying said solution in order to form d-α-benzylpenicilloic acid therein, and extracting the d-α-benzylpenicilloic acid therefrom.

4. The process which comprises reacting an aqueous solution of the disodium salt of d-α-benzylpenicilloic acid with approximately 2 molar equivalents of hydrochloric acid, and recovering the d-α-benzylpenicilloic acid thus formed.

5. The process of preparing d-α-benzylpenicilloic acid which comprises acidifying an aqueous solution of a salt of d-α-benzylpenicilloic acid, and extracting said acid therefrom.

6. The process of preparing d-α-benzylpenicilloic acid which comprises acidifying an aqueous solution of a salt of said acid, extracting said acid from said solution with an organic extractant, and recovering said d-α-benzylpenicilloic acid in solid form therefrom.

7. The process of preparing d-α-benzylpenicilloic acid which comprises acidifying an aqueous solution of the salt of d-α-benzylpenicilloic acid, and extracting said acid with ether from said solution.

8. The process of preparing d-α-benzylpenicilloic acid in solid form which comprises acidifying an aqueous solution of a sodium salt of d-α-benzylpenicilloic acid, extracting said acid therefrom with ether, and evaporating said ether solution to dryness.

9. The process of preparing d-α-benzylpenicilloic acid in solid form which comprises acidifying an aqueous solution of a sodium salt of d-α-benzylpenicilloic acid with hydrochloric acid to convert said salt to d-α-benzylpenicilloic acid, extracting said d-α-benzylpenicilloic acid from said solution with ether, and evaporating said ether solution to dryness in order to obtain the desired product in solid, substantially pure form.

10. The process of preparing d-α-benzylpenicilloic acid in solid form which comprises acidifying an aqueous solution of a salt of d-α-benzylpenicilloic acid and recovering said precipitated acid from said solution.

11. The process of preparing d-α-benzylpenicilloic acid which comprises acidifying an aqueous solution of a sodium salt of d-α-benzylpenicilloic acid, thereby precipitating said acid, and recovering said precipitated acid from said solution by filtration.

12. The process of preparing d-α-benzylpenicilloic acid in solid form which comprises acidifying an aqueous solution of a sodium salt of d-α-benzylpenicilloic acid, thereby precipitating said acid, and recovering said precipitated acid from said solution by centrifugal separation.

13. The process of securing d-α-benzylpenicilloic acid in solid form which comprises precipitating said acid from a solution of a sodium salt of d-α-benzylpenicilloic acid by acidifying said solution.

DONALD E. WOLF.

(References on following page)

REFERENCES CITED

The following references are of record in the file of this patent:

Abraham et al., "Nature," December 23, 1940, page 837.
Abraham, British J. of Experimental Pathology, vol. 23, No. 3, June 1942, pp. 103–115.
Squibb Reports S1, page 8, September, October, 1943.
Abbott Report, CMR-A-1, page 9, December 29, 1943.
Abraham et al., British Report CMR-Br-XV, CPS-21, February 23, 1944, pp. 1 and 2.
Abraham et al., British Report CMR-Br-XVI, CPS-22 February 26, 1944, pp. 3 and 4.
Pfizer Report CMR-P-XII, June 7, 1944, page 2.
Dale, "Nature," December 9, 1944, vol. 154, page 725.
Committee et al., "Science," vol. 102, December 21, 1945, page 628.
Fleming, "Penicillin," 1946, Blakiston Co., page 29.
The Chemistry of Penicillin, Princeton Univ. Press (1949), p. 18.